(12) United States Patent
Chen

(10) Patent No.: US 12,172,478 B2
(45) Date of Patent: Dec. 24, 2024

(54) DOUBLE-SAFETY TRAILER LOCK WITH ADJUSTABLE LENGTH

(71) Applicant: Ruian Juli Auto Parts Processing Factory, Ruian (CN)

(72) Inventor: Guangliang Chen, Ruian (CN)

(73) Assignee: Ruian Juli Auto Paris Processing Factory

( * ) Notice: Subject to any disclaimer, the term of this patent is extended or adjusted under 35 U.S.C. 154(b) by 204 days.

(21) Appl. No.: 17/952,381

(22) Filed: Sep. 26, 2022

(65) Prior Publication Data
US 2023/0020914 A1    Jan. 19, 2023

(51) Int. Cl.
*B60D 1/28*    (2006.01)
(52) U.S. Cl.
CPC ..................................... *B60D 1/28* (2013.01)
(58) Field of Classification Search
CPC ........ E05B 67/00; E05B 67/06; E05B 67/063; E05B 67/08; E05B 67/10; E05B 67/14; E05B 67/18; E05B 67/22; E05B 67/28; E05B 67/32; E05B 2067/066; B60D 1/00; B60D 1/24; B60D 1/28
USPC .......................................................... 70/360
See application file for complete search history.

(56) References Cited

U.S. PATENT DOCUMENTS

| | | | | |
|---|---|---|---|---|
| 4,792,151 A * | 12/1988 | Feld | .................... | B60D 1/065 280/509 |
| 6,829,915 B1 * | 12/2004 | Li | .................... | E05B 67/003 70/53 |
| 7,926,832 B1 * | 4/2011 | Hall | .................... | B60D 1/065 280/441.2 |
| 2002/0003341 A1 * | 1/2002 | Hall | .................... | B60D 1/28 280/423.1 |
| 2002/0166356 A1 * | 11/2002 | Kuo | .................... | E05B 1/0038 70/360 |
| 2008/0106065 A1 * | 5/2008 | Cutts | .................... | B60D 1/145 280/504 |
| 2019/0077204 A1 * | 3/2019 | Smith | .................... | B60D 1/187 |

* cited by examiner

*Primary Examiner* — Nathan Cumar
(74) *Attorney, Agent, or Firm* — Jose Cherson Weissbrot

(57) ABSTRACT

A double-safety trailer lock with an adjustable length comprises a lock bar and a lock body matched with the lock bar, wherein one end of the lock bar far from the lock body is a large-diameter end, an external thread is provided on the large-diameter end, an adjusting sleeve is arranged outside the large-diameter end, and an internal thread is provided on the inner wall of the adjusting sleeve, so that the adjusting sleeve can move axially along the large-diameter end by matching the internal thread with the external thread; through the axial movement of the adjusting sleeve relative to the lock bar, the effective length of the lock bar can be adjusted, and the effective length of the lock bar is basically the same as the required length between the actual family car and the trailer, so that the movement of the lock bar in the use process is minimized, and the connection of the trailer lock is more stable.

6 Claims, 5 Drawing Sheets

DOUBLE-SAFETY TRAILER LOCK WITH ADJUSTABLE LENGTH

TECHNICAL FIELD

The present application relates to a double-safety trailer lock with an adjustable length.

BACKGROUND

A trailer lock is a kind of lock used to connect a family car with a trailer. When traveling, people can carry more luggage and household appliances by configuring trailer, so as to improve the quality of travel. A trailer lock generally includes a lock bar and a lock body, and the lock bar is inserted into the lock body and locked to achieve a fixed connection. The existing trailer lock does not have the function of length adjustment, so the lock bar is too long to cause axial movement during work, and the work is unstable. If the lock bar is too short, it cannot be inserted between the connectors of the family car and the trailer, and the fixed connection cannot be formed. In addition, the trailer lock is the intermediate connector connecting the family car with the trailer, and it is constantly stressed in the working process. The non-directional force may cause the connecting part of the lock bar and the lock body to separate in the actual working process of the trailer lock, thus leading to safety accidents.

SUMMARY

In view of the shortcomings of the above problems, the present application provides a double-safety trailer lock with an adjustable length.

In order to achieve the above purpose, the present application provides a double-safety trailer lock with an adjustable length, which includes a lock bar and a lock body matched with the lock bar, wherein one end of the lock bar far from the lock body is a large-diameter end, an external thread is provided on the large-diameter end, an adjusting sleeve is arranged outside the large-diameter end, and an internal thread is provided on the inner wall of the adjusting sleeve, so that the adjusting sleeve can move axially along the large-diameter end by matching the internal thread with the external thread;

through the axial movement of the adjusting sleeve relative to the lock bar, the effective length of the lock bar can be adjusted, and the effective length of the lock bar is basically the same as the required locking length between the actual family car and the trailer, so that the movement of the lock bar in the use process is minimized, and the connection of the trailer lock is more stable.

As a further improvement of the solution, a clamping spring is arranged at an inlet of the adjusting sleeve, and a spring is arranged in the adjusting sleeve; one end of the spring abuts against a bottom surface of the adjusting sleeve, and the other end abuts against the large-diameter end;

in the technical solution, the clamping spring limits the displacement of the adjusting sleeve, so that the adjusting sleeve is prevented from being completely separated from the large-diameter end, and the spring plays the role of elastic extrusion, so that the hand feeling is better in the adjusting process; and under the acting force of the spring, the connection between the adjusting sleeve and the large-diameter end is more stable, and the adjusting sleeve does not move axially under the condition of artificial adjustment, so that the actual use is more stable.

As a further improvement of the solution, the outer circumferential surface of the adjusting sleeve is provided with reticulate patterns;

in the technical solution, the friction force is increased by the reticulate patterns, which is convenient to manually adjust the position of the adjusting sleeve.

As a further improvement of the solution, the lock bar is further provided with a dust-proof plug, the size of a middle hole of the dust-proof plug is matched with that of the lock bar, and one end of the dust-proof plug is clamped at the inlet of the adjusting sleeve and forms a fixed connection with the adjusting sleeve.

in the technical solution, the dust-proof plug plays a dustproof role in the adjusting sleeve.

As a further improvement of the solution, one end of the lock bar close to the lock body is provided with a bolt hole, and the bolt hole is provided with a bolt;

in the technical solution, a double safety function is formed on the trailer lock through the bolt.

As a further improvement of the solution, the bolt is R-shaped as a whole, and the bolt includes a straight line segment which can be inserted into the bolt hole, two broken line segments attached to the side of the lock bar and an arc segment connecting the straight line segment and the two broken line segments; the other ends of the broken line segments far away from the arc segment form an upturned edge;

in the technical solution, the R-shaped bolt design makes the bolt difficult to separate after being inserted into the bolt hole.

Compared with the prior art, the trailer lock has the beneficial effects that: the trailer lock has the function of length adjustment and double safety, and the lock bar can be adjusted to a proper connecting length by adjusting the position of the adjusting sleeve, thus ensuring that the lock bar has a small axial movement space and small axial movement in the working process; With the bolt, the possibility that both the bolt and the lock body are connected with the lock bar is small, and the connection of double safety is more secure.

Figure 1:
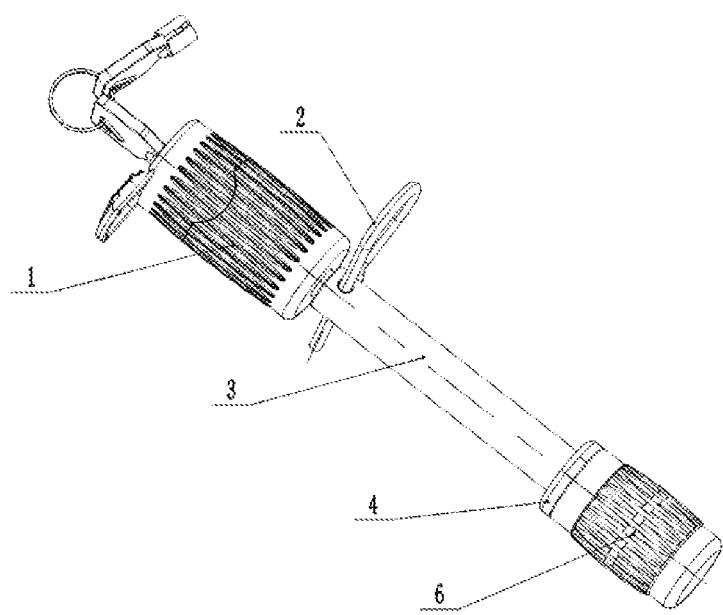
FIG. 1 is a perspective view of a trailer lock with an adjustable length.

In the drawings: 1. Lock body; 2. Bolt; 21. Straight line segment; 22. Arc segment; 23. Broken line segment; 24, Upturned edge; 3. Lock bar; 31. Large-diameter end; 32. Bolt hole; 4. Dust-proof plug; 5. Clamp spring; 6. Adjusting sleeve; 7. Spring.

DESCRIPTION OF EMBODIMENTS

Figure 2:
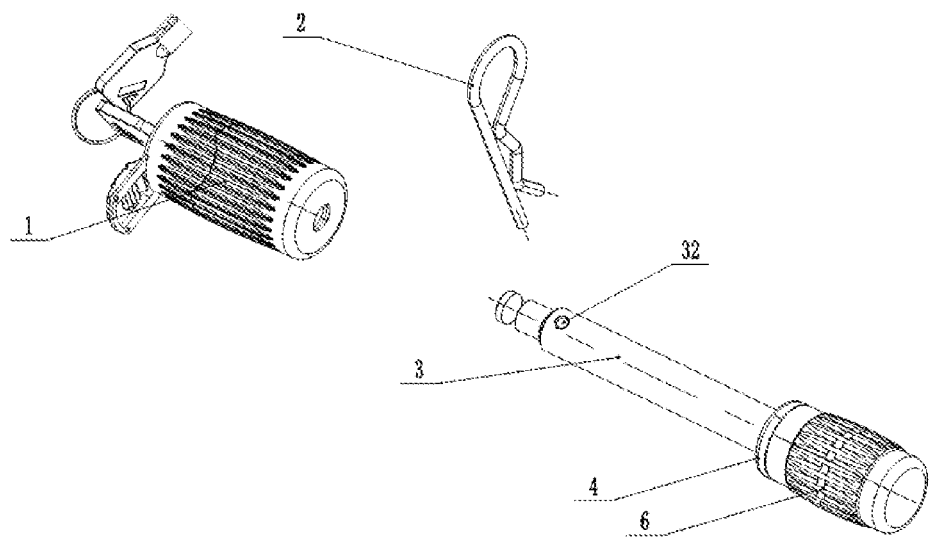
FIG. 2 is an explosion diagram of a trailer lock with an adjustable length.
Figure 3:
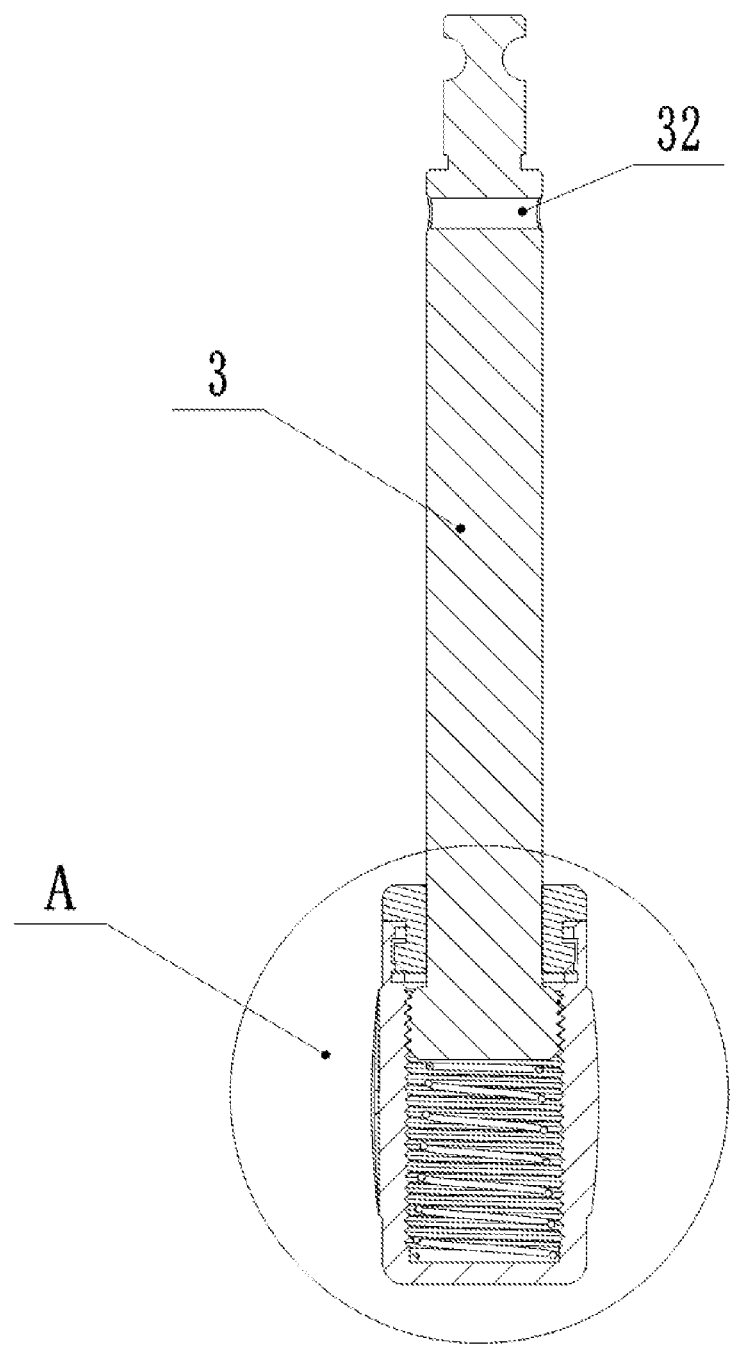
FIG. 3 is a schematic diagram of the connecting structure of the lock bar and the adjusting sleeve.
Figure 4:
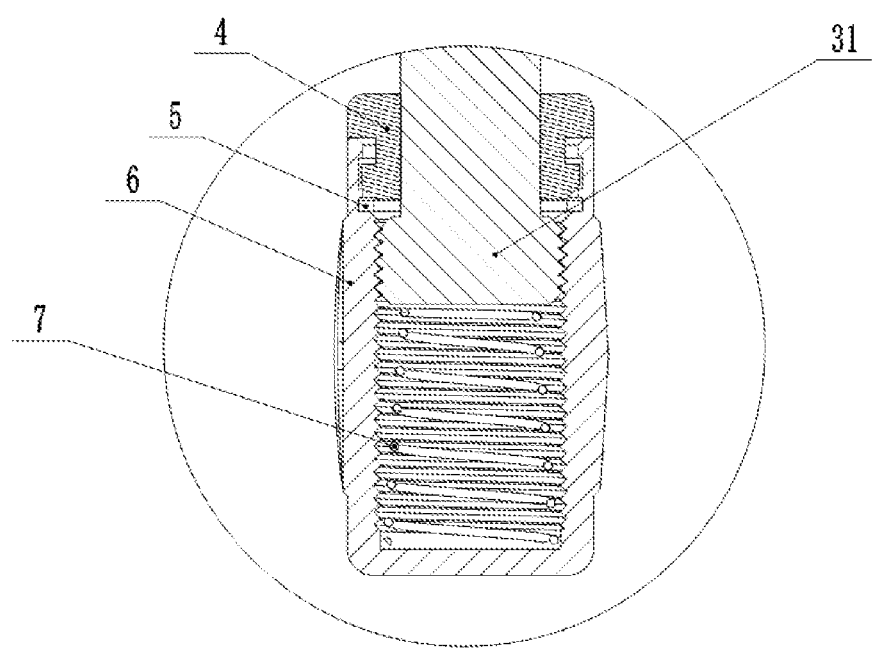
FIG. 4 is an enlarged view of position a in FIG. 3.
Figure 5:
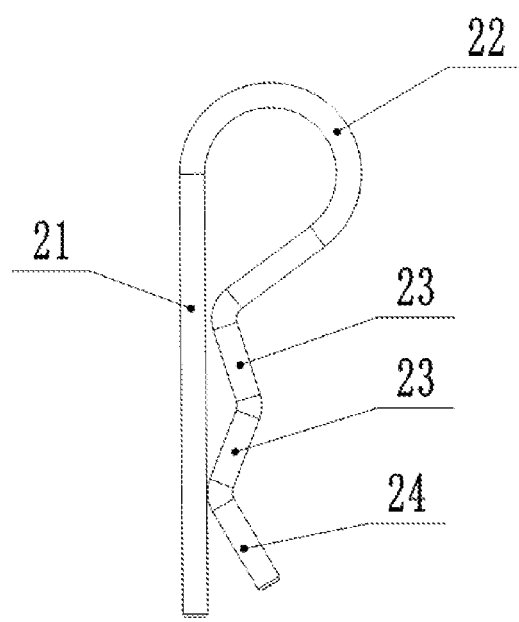
FIG. 5 is a schematic diagram of the bolt.

As shown in FIGS. 1-5, the length-adjustable double-safety trailer lock of the embodiment of the present application includes a lock bar 3 and a lock body 1 matched with the lock bar 3. One end of the lock bar 3 far from the lock body 1 is a large-diameter end 31. The large-diameter end 31 is provided with an external thread, and an adjusting sleeve 6 is arranged outside the large-diameter end 31. An internal thread is provided on the inner wall of the adjusting sleeve 6. By matching the internal thread with the external thread, the adjusting sleeve 6 can move axially along the large-diameter end 31. A clamping spring 5 is arranged at the inlet of the adjusting sleeve 6, and a spring 7 is arranged in the adjusting sleeve 6. One end of the spring 7 abuts against the bottom surface of the adjusting sleeve 6, and the other end abuts against the end surface of the large-diameter end 31. The clamping spring limits the displacement of the adjusting sleeve to avoid the complete separation of the adjusting sleeve from the large-diameter end, and the spring plays the role of elastic extrusion, which makes the hand feel better in the adjusting process. Under the action of the spring, the connection between the adjusting sleeve and the large-diameter end is more stable. Under the condition of no artificial adjustment, the adjusting sleeve does not move axially, and the actual use is more stable. The outer circumferential surface of the adjusting sleeve 6 is provided with reticulate patterns, and the frictional force is increased by the reticulate patterns, so that the position of the adjusting sleeve can be adjusted manually. The lock bar 3 is also provided with a dust-proof plug 4, and the size of the middle hole of the dust-proof plug 4 is matched with the lock bar 3. One end of the dust-proof plug 4 is clamped into the inlet of the adjusting sleeve 6, and forms a fixed connection with the adjusting sleeve 6, so that the dust-proof plug plays a dustproof role in the adjusting sleeve. One end of the lock bar 3 close to the lock body 1 is provided with a bolt hole 32, and the bolt hole 32 is provided with a bolt 2, which forms a double safety function on the trailer lock. The bolt 2 is R-shaped as a whole. The bolt 2 includes a straight line segment 21 that can be inserted into the bolt hole 32, two broken line segments 23 attached to the side of the lock bar 3, and an arc segment 22 that connects the straight line segment 21 and the two broken line segments 23. The other end of the broken line segment 23 away from the arc segment 22 forms an upturned edge 24. The R-shaped bolt design makes it difficult for the bolt to be separated after being inserted into the bolt hole. The outer side of the lock body 1 is provided with a plastic coating, and the dust-proof plug 4 is made of rubber, which is convenient for quick assembly through the contraction of rubber. In the use process of the trailer lock, the lock body 1 and the dust-proof plug 4 are in direct contact with the body drag rod, and when they are in contact, the plastic and rubber are in contact with the body drag rod made of metal, thus avoiding the direct contact between metal and reducing wear.

The trailer lock has the function of length adjustment and double safety. By adjusting the position of the adjusting sleeve, the lock bar can be adjusted to a suitable connecting length, which ensures that there is a small space for axial movement of the lock bar during its working process. With the bolt, the possibility that both the bolt and the lock body are connected with the lock bar is small, and the connection of double safety is more secure.

When in use, in order to facilitate the understanding of the present application, it will be described with reference to the attached drawings.

The trailer lock is generally vertically arranged when in use, and the lock body 1 is located above. After unlocking the lock body 1 and the lock bar 3, the lock bar 3 passes through the connecting holes of the family car and trailer in turn, and then the lock body 1 is locked above the lock bar 3. The bolt 2 is inserted into the bolt hole 32, so that the upper part of the trailer lock can be double-secured. Turn the adjusting sleeve 6 to a proper position, so that the distance from the upper end of the adjusting sleeve 6 to the bolt 2 is basically the same as the required locking length, so as to reduce the locking rod.

The above is only the preferred embodiment of the present application, and it is not intended to limit the present application. For those skilled in the art, the present application can be modified and varied. Any modification, equivalent substitution, improvement, etc. made within the spirit and principle of the present application shall be included in the scope of protection of the present application.

What is claimed is:

1. A double-safety trailer lock with an adjustable length, comprising: a lock bar and a lock body matched with the lock bar, wherein one end of the lock bar far from the lock body is a large-diameter end, an external thread is provided on the large-diameter end, an adjusting sleeve is arranged outside the large-diameter end, and an internal thread is provided on an inner wall of the adjusting sleeve, so that the adjusting sleeve can move axially along the large-diameter end by matching the internal thread with the external thread.

2. The double-safety trailer lock with an adjustable length according to claim 1, wherein a clamping spring is arranged at an inlet of the adjusting sleeve, and a spring is arranged in the adjusting sleeve; one end of the spring abuts against a bottom surface of the adjusting sleeve, and the other end abuts against the large-diameter end.

3. The double-safety trailer lock with an adjustable length according to claim 2, wherein an outer peripheral surface of the adjusting sleeve is provided with reticulate patterns.

4. The double-safety trailer lock with an adjustable length according to claim 3, wherein the lock bar is further provided with a dust-proof plug, the size of a middle hole of the dust-proof plug is matched with that of the lock bar, and one end of the dust-proof plug is clamped at the inlet of the adjusting sleeve and forms a fixed connection with the adjusting sleeve.

5. The double-safety trailer lock with an adjustable length according to claim 1, wherein one end of the lock bar close to the lock body is provided with a bolt hole, and the bolt hole is provided with a bolt.

6. The double-safety trailer lock with an adjustable length according to claim 5, wherein the bolt is R-shaped; the bolt comprises a straight line segment which can be inserted into the bolt hole, two broken line segments attached to the side of the lock bar and an arc segment connecting the straight line segment and the two broken line segments; the other ends of the broken line segments far away from the arc segment form an upturned edge.

* * * * *